J. S. CRISLER.
ANIMAL TRAP.
APPLICATION FILED MAY 8, 1915.

1,198,332.

Patented Sept. 12, 1916.
2 SHEETS—SHEET 1.

Witnesses

Inventor
J. S. Crisler
By
Attorneys

J. S. CRISLER.
ANIMAL TRAP.
APPLICATION FILED MAY 8, 1915.

1,198,332.

Patented Sept. 12, 1916.
2 SHEETS—SHEET 2.

Witnesses    Inventor
             J. S. Crisler

UNITED STATES PATENT OFFICE.

JOHN S. CRISLER, OF MACEDONIA, IOWA.

ANIMAL-TRAP.

1,198,332.  Specification of Letters Patent.  Patented Sept. 12, 1916.

Application filed May 8, 1915. Serial No. 26,769.

*To all whom it may concern:*

Be it known that I, JOHN S. CRISLER, a citizen of the United States, residing at Macedonia, in the county of Pottawattamie, State of Iowa, have invented certain new and useful Improvements in Animal-Traps; and I do hereby declare the following to be a full, clear, and exact description of the invention, such as will enable others skilled in the art to which it appertains to make and use the same.

This invention relates to improvements in animal traps.

An object of the invention is to provide an improved device of this character of such construction that an animal may be killed and knocked out of the way for the next animal.

Another object is to provide a device of this character which, after killing and throwing one animal out of the way, will automatically return to normal position ready to be tripped by another animal.

Other objects and advantages will be apparent from the following description when taken in connection with the accompanying drawing.

Figure 1:
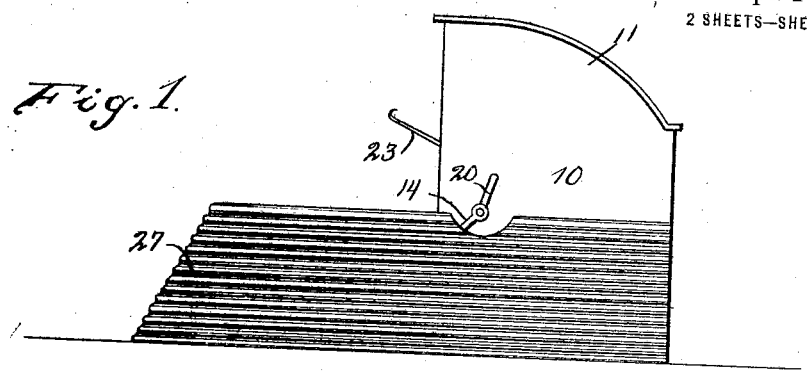
Figure 3:
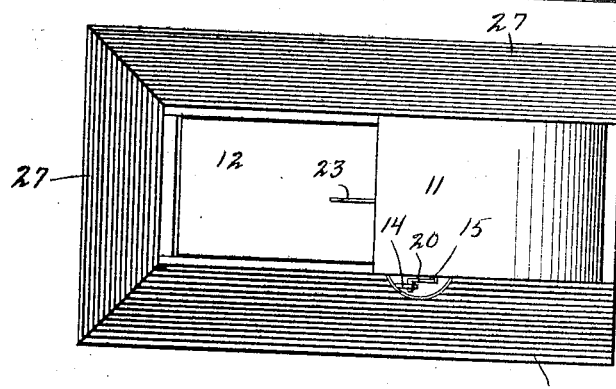
Figure 2:
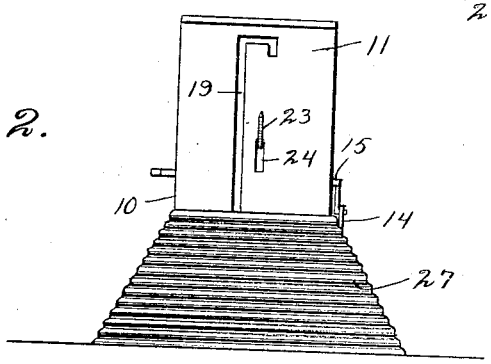
Figure 8:
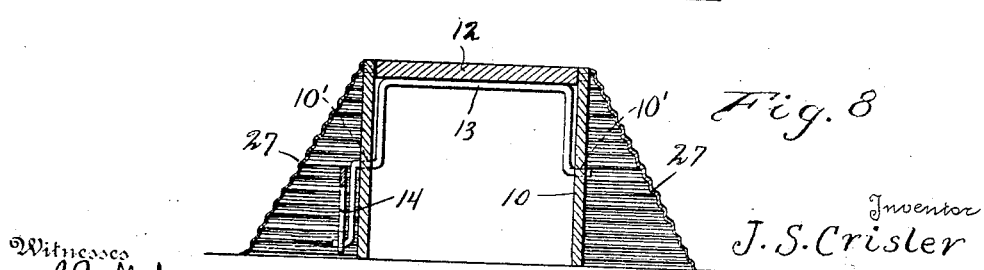
Figure 4:
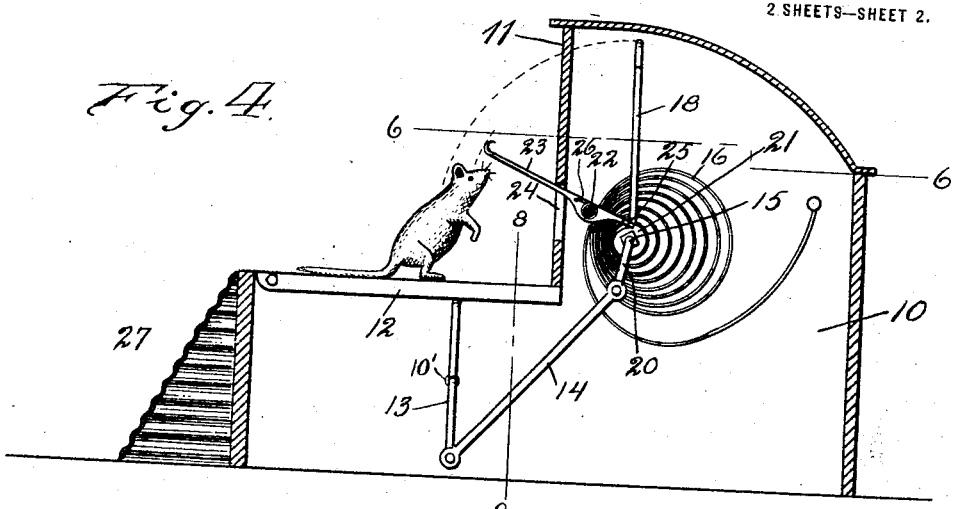
Figure 5:
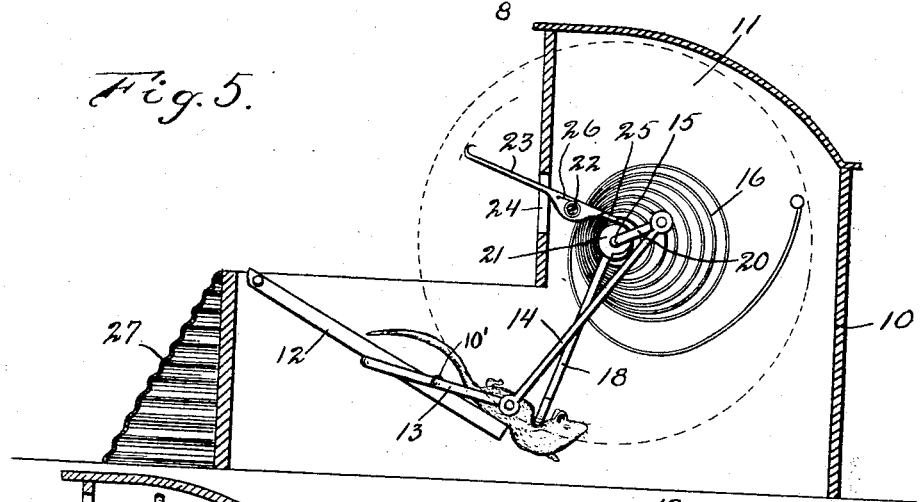
Figures 6, 7:
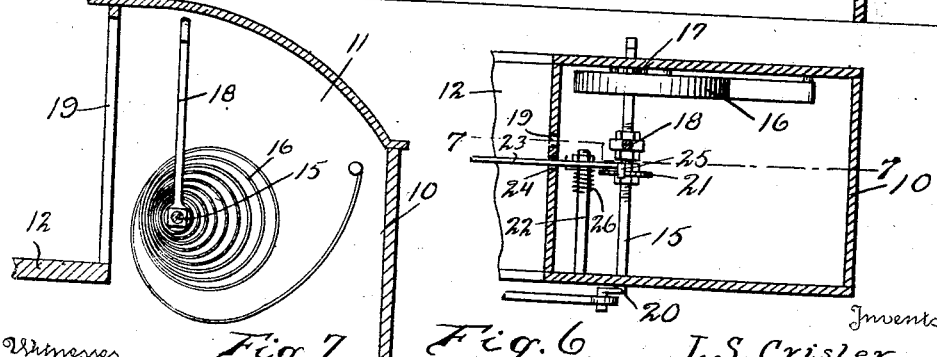

In the drawing: Figure 1 is a side elevation of a trap made in accordance with my invention, Fig. 2 is a front elevation, Fig. 3 is a top plan view, Fig. 4 is a side elevation of the trap with one of the walls of the trapping receptacle removed. Fig. 5 is a view similar to Fig. 4 showing the position of the parts when the trap is swung, Fig. 6 is a horizontal sectional view on the line 6—6 of Fig. 4, Fig. 7 is a section on the line 7—7 of Fig. 6, Fig. 8 is a vertical transverse section on the line 8—8 of Fig. 4.

Referring particularly to the accompanying drawing, 10 represents a suitable box or casing, at one end of which is arranged an elevated housing section 11. At the other end in the top of the casing 10 is mounted a platform 12, the same being hinged to the casing 10 at the end remote from the casing section 11. Mounted in the casing 10 and having its ends rotatably supported in openings 10' in the side walls thereof is a crank lever 13, the inner end of which bears against the underside of the platform 12, while the other end is pivotally connected to one end of a pitman 14. Extending transversely through the housing 11 is a shaft 15, on one end portion of which, within the casing, is mounted a coil spring 16, one end being secured to the shaft, and the other to the casing. This end of the shaft extends through the side of the housing and is adapted for engagement of a key whereby the spring can be wound by the turning of the shaft, a pawl and ratchet 17 being arranged to hold the spring while being wound up. Mounted on the shaft 15 and extending normally in a vertical position is a striker arm 18 which is arranged to pass through a slot 19 formed in the vertical front wall of the housing 11. The other end of the connecting rod 14 is connected to a crank 20 on the adjacent end of the shaft 15. Also mounted rigidly on the shaft 15 is a notched disk 21. Extending inwardly from one side of the housing is a shaft 22, and rotatably mounted on this shaft is a hook arm 23 which extends through the vertical slot 24 in the front of the housing on which is placed the bait. The inner end of the arm 23 is formed with a laterally extending lug 25 engaging with one of the notches of the disk 21. A coil spring 26 is mounted on this shaft 22, and is connected to the shaft and to the arm to normally swing the arm upward so that the inner end thereof will be in the path of the notches of the disk. Surrounding the casing 10 are the downwardly and outwardly inclined corrugated walls 27 which serve as stepped approaches so that the animals can climb up to the platform 12.

In the normal position of the device, after the spring has been properly wound up, the bait arm extends through the slot 24 in elevated position over the platform, the platform being supported by the upper end of the crank arm 13 while the shaft is held against rotation by engagement of the arm 23 with a notch of the disk, thus holding the striker arm 18 in a vertical position within the housing.

In the operation of the device a rat or mouse climbs up on to the platform 12 and then reaches up for the bait on the arm 23. When the animal reaches the bait the arm 23 will be pulled down, so that the inner end thereof is lifted out of the notch of the disk 21. The spring 16 then rotates the shaft 15 and causes the arm 18 to fly through the slot 19 and deliver a violent blow on the animal's head or neck. At the same time that the arm strikes the animal, the crank 20 rocks the crank 13 by means of the link 14 and permits the weight of the animal's body to depress the platform. The arm 18 carries the animal down into the casing 10 and wipes it off the end of the platform. The spring 26 again raises the arm 23 so that when the shaft has made its complete revolution and the arm 18 is again in vertical position, the notch of the disk will again receive the inner end of the arm. In this latter half of the movement of the device the crank 20 actuates the crank 13 so that the platform is again lifted into horizontal position. The parts are thus restored to normal position ready for the next animal.

With one winding of the spring 16, the trap will operate to kill an animal and reset itself from fifteen to twenty times.

What is claimed is:

An animal trap comprising a suitable support, a horizontal and depressible platform pivotally mounted on the support, a motor including a shaft having a disk formed with a notch in its periphery, a bait lever pivotally mounted adjacent the motor shaft and engaging with one of its ends in the said notch, a striking lever carried by and movable with the shaft, a pivotally supported crank member supporting the said platform, an arm carried by the shaft, and a link pivotally connected to the arm and to the crank member.

In testimony whereof, I affix my signature, in the presence of two witnesses.

JOHN S. CRISLER.

Witnesses:
C. W. WIGGINTON,
W. A. BRADEN.